United States Patent [19]

McGinn

[11] Patent Number: 5,130,697
[45] Date of Patent: Jul. 14, 1992

[54] METHOD AND APPARATUS FOR SHAPING A MAGNETIC FIELD

[75] Inventor: Colleen McGinn, Boca Raton, Fla.

[73] Assignee: Sensormatic Electronics Corporation, Deerfield Beach, Fla.

[21] Appl. No.: 605,826

[22] Filed: Oct. 30, 1990

[51] Int. Cl.⁵ .............................................. G08B 13/24
[52] U.S. Cl. ...................................... 340/551; 340/572
[58] Field of Search ................................ 340/572, 551; 343/841–842

[56] References Cited

U.S. PATENT DOCUMENTS 4,769,631 9/1988 Copeland .............................. 340/551

Primary Examiner—Jin F. Ng
Assistant Examiner—Thomas J. Mullen, Jr.
Attorney, Agent, or Firm—Robin, Blecker, Daley & Driscoll

[57] ABSTRACT

An apparatus for use with a magnetic field in which eddy currents are generated and the generated currents are configured to provide a preselected effect to the field.

88 Claims, 5 Drawing Sheets

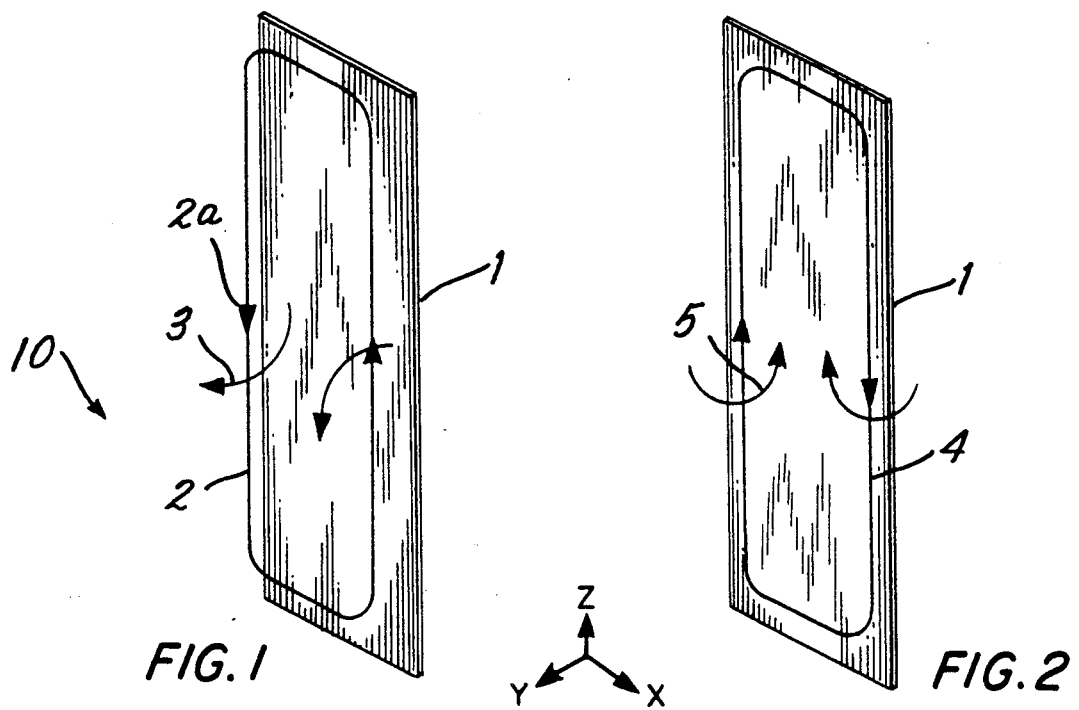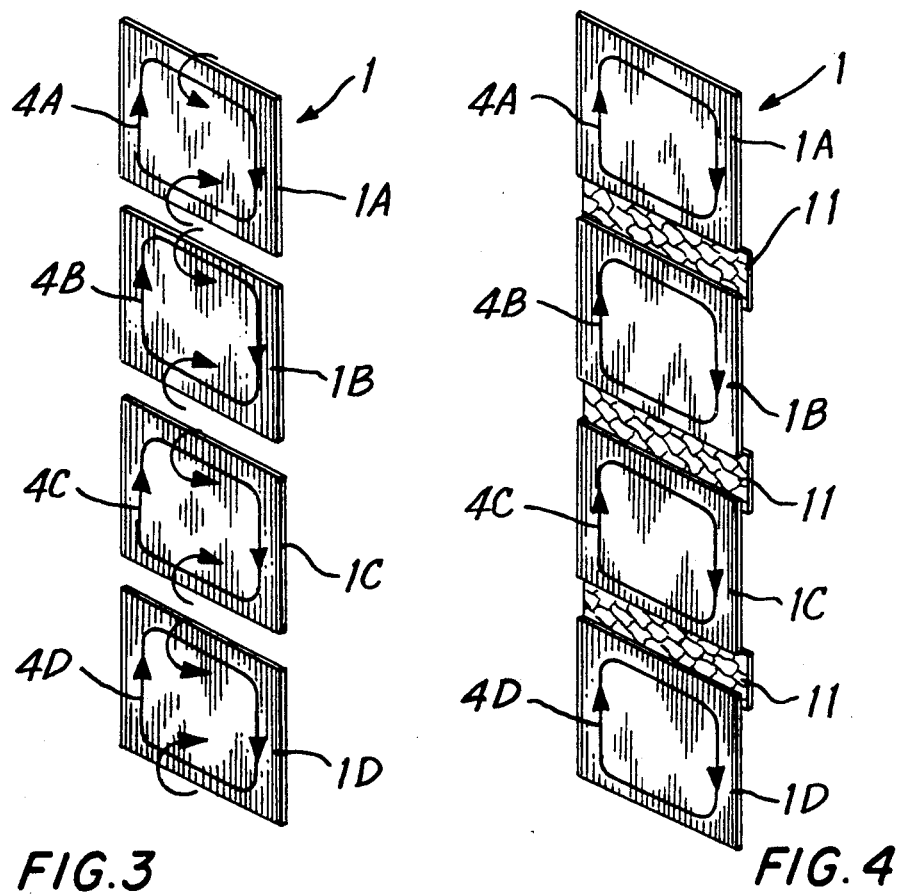

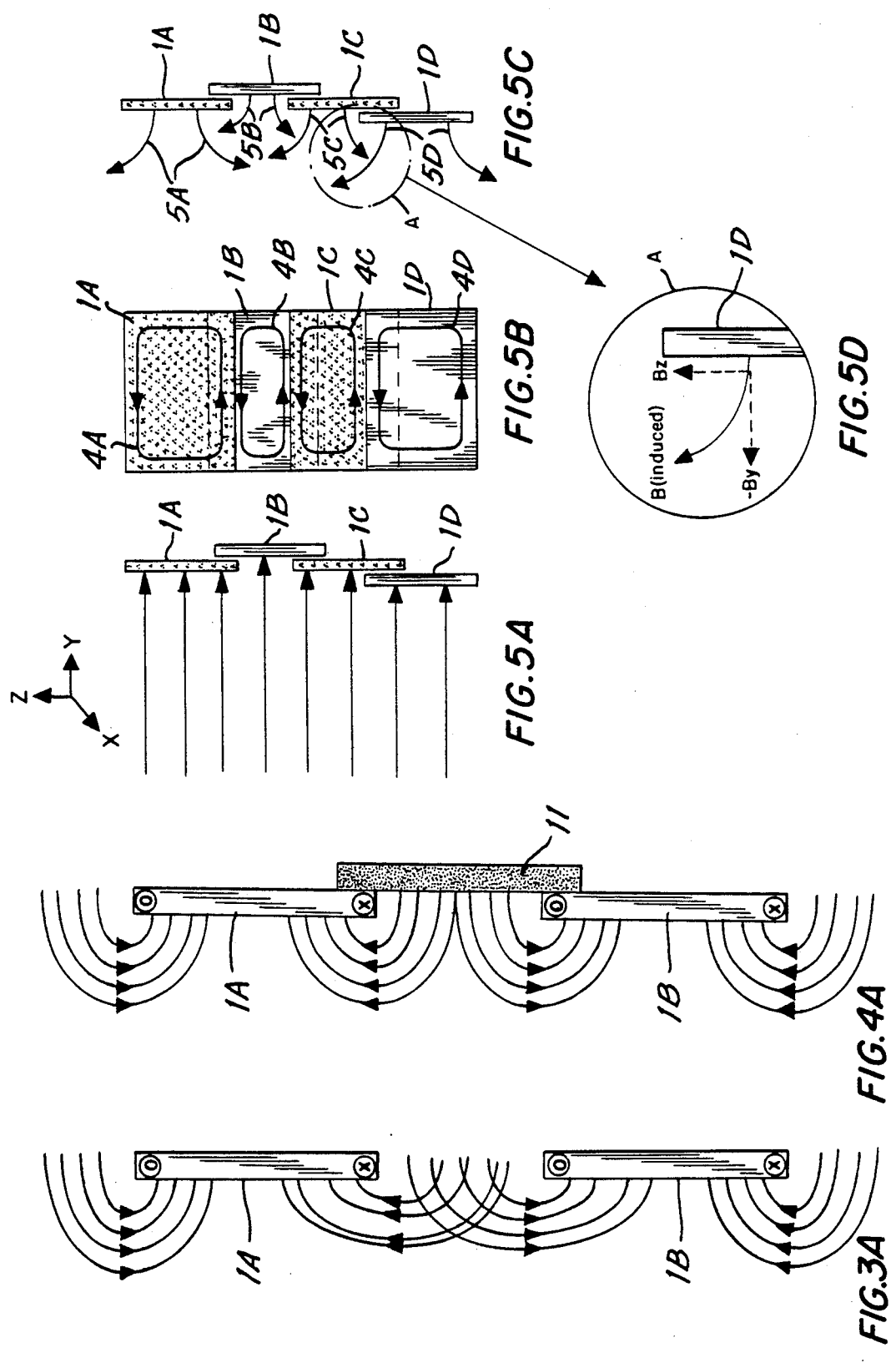

METHOD AND APPARATUS FOR SHAPING A MAGNETIC FIELD

DETAILED DESCRIPTION

This invention relates to magnetic fields and, in particular, to methods and apparatus for controlling and shaping these fields.

Controlling and shaping a magnetic field is desirable in a number of system applications. A particular system in which this is so is an electronic article surveillance system using magnetic fields.

In a surveillance system of this type, articles to be monitored are provided with magnetic tags which are used to detect the articles when the articles pass through a surveillance zone. A transmitter, bordering the surveillance zone, transmits a magnetic field into the zone. The presence of a magnetic tag causes a signal to be generated when the magnetic tag passes into the zone. A receiver detects this signal and provides an alarm indicating the presence of the tag and, therefore, the article.

While magnetic article surveillance systems have certain advantages (e.g., they tend to be less expensive than other types of surveillance systems), they also have certain disadvantages which detract from their usefulness. Thus, in magnetic systems, the transmitter field, if left uncontrolled, may extend beyond the surveillance zone into areas containing metallic objects or articles on display. This can cause erroneous detections and false alarm signals.

Also, with many magnetic systems, the geometry of the transmitter antenna produces a transmitted field that is non-uniform with strong and weak field areas. In some situations, this can adversely affect system performance. Additionally, the signals caused by the presence of a magnetic tag are relatively small. The system receiver must, therefore, have a high sensitivity if these signals are to be detected with any degree of certainty.

Attempts at compensating for these adverse effects have looked to maximizing the magnetic field inside the surveillance zone (commonly referred to as the "frontfield") in relation to the field outside the surveillance zone (commonly referred to as the "backfield"). Early proposals for accomplishing this focused on the use of antenna arrays for the transmitter and receiver antennas. However, while this approach worked well for high frequency systems, it was not effective for magnetic systems which operate at lower frequencies (frequencies typically in the range of about 50 Hz to 100 kHz). At these lower frequencies, because of wavelength, mode of propagation and the resultant large antenna arrays required, a practical system was not obtainable.

Other attempts at controlling the magnetic field looked to the use of conventional shielding members. Conventional shielding members employ materials which are primarily designed for shielding a desired area from outside noise and other undesirable outside signals (i.e., to keep signals out of an area). As a result, these materials have optimum shielding properties at very low frequencies (most are designed for maximum effect at 60 Hz, the most common frequency of magnetic noise) and attenuate the incoming field by either reflection or adsorption. Conventional arrangements for using these shielding materials, however, while providing desired backfield attenuation, have also caused undesired frontfield attenuation. These conventional shields thus result in an unsatisfactory degradation in system performance.

Another attempt at fabricating shields for magnetic systems is disclosed in U.S. Pat. No. 4,769,631, which is assigned to same assignee hereof and the teachings of which are incorporated herein by reference. The '631 patent looks to fabrication of a shield from high resistivity, high permeability interleaved squares of material whose skin depth is required to be much greater than (e.g., multiples of) the sheet thickness.

The use of a high permeability material for the '631 patent shield provides a low reluctance path for the incident field to follow at the border of the surveillance zone. This inhibits the field from extending beyond the zone, i.e., tends to maximize frontfield relative to backfield. The skin depth requirement of the shield, in turn, minimizes or prevents eddy current generation in the shield which, if allowed to occur, would tend to reduce the confined frontfield. Moreover, the use of interleaved squares further reduces any eddy currents and, for any minimal eddy currents generated, tends to cause the resultant fields produced by these currents to cancel.

The '631 patent also provides an auxiliary shield for preventing signals generated in the backfield from reaching or disturbing the frontfield. This auxiliary shield is placed in back of the primary shield (i.e., further outward of the zone) and is designed to support eddy currents by having a skin depth equal to or greater than the sheet thickness. These currents, in turn, generate a field which opposes and tends to cancel any signals generated in the backfield, thereby preventing them from disturbing the frontfield.

The shields of the '631 patent have thus been designed with the primary aim of maximizing the frontfield relative to the backfield in a magnetic system. Other than maximizing the frontfield, however, these shields do not permit selective control or enhancement of parts or components of the field, as is desired in many applications. Furthermore, the need in these shields for a high resistivity material, results in losses which reduce the overall field strength available. As a result, the shield is not a suitable candidate for zones of relatively large extent.

It is, therefore, an object of the present invention to provide a method and apparatus for realizing enhanced control over a magnetic field in a zone.

It is a further object of the present invention to provide a method and apparatus which can be used to selectively reinforce and decrease magnetic field components in a zone.

It is yet a further object of the present invention to provide a method and apparatus for providing enhanced control of the magnetic field in the surveillance zone of an electronic article surveillance system.

It is still a further object of the present invention to provide a method and apparatus for providing enhanced control of the magnetic field in the frontfield of an electronic article surveillance system while simultaneously achieving a low backfield.

It is also an object of the present invention to realize the above objectives for magnetic fields in the frequency range of about 50 Hz to 100 kHz.

SUMMARY OF THE INVENTION

In accordance with the principles of the present invention, the above and other objectives are realized in an apparatus and method in which eddy currents are developed and used to cause preselected and desired effects to a magnetic field in a zone. More particularly, by selecting the configuration as well as the material of the apparatus of the invention, eddy currents are generated to produce a variety of desired effects.

In the apparatus of the invention, two characteristics of importance are the permeability and conductivity of the material of the apparatus. Suitable selection of these characteristics as well as the geometry of the apparatus enables one to control the phase and strength of the eddy currents developed and, hence, their resultant effect on the field in the zone.

Generally, if the apparatus of the invention is intended to selectively add and subtract from the frontfield (i.e., to shape the field) rather than to maximize it relative to the backfield (i.e., to confine the field) the material used for the apparatus will preferably be of relatively high conductivity. If the apparatus, on the other hand, is to be used primarily to confine the field, while also providing some shaping, the material used for the apparatus will preferably be of a high permeability and of a relatively low, but sufficient conductivity to provide the desired shaping. Combinations of these two types of apparatus of the invention as well as varying the resistivity and permeability of a given apparatus can also be used to provide various desired effects.

The apparatus of the invention can additionally be used with a high permeability backing, in order to further ensure increased confinement of the field to the zone.

The manner of configuration of the apparatus of the invention can also take on a variety of forms. Generally, a plurality of elements or members are used and are situated and shaped to produce the desired field effects. Typically, to realize field effects in a given direction at desired locations, these members are situated so that they have edges transverse (preferably orthogonal) to the given direction at the desired locations. Thus, to realize field effects in the horizontal and lateral directions, the members are arranged so that they have vertical edges at the desired locations, while to realize field effects in the vertical direction the members are arranged with their horizontal edges at the desired locations. Furthermore, adjacent members can be made of different size or isolated one from the other so as to prevent the field effects from adjacent edges of the members from cancelling.

Use of the apparatus and methods of the invention in conjunction with an electronic article surveillance system and the transmit and receive antennas of such a system are also disclosed.

BRIEF DESCRIPTION OF THE DRAWINGS

The above and other features and aspects of the present invention will become apparent upon reading the following detailed description in conjunction with the accompanying drawings, in which:

FIG. 1 shows schematically an apparatus in accordance with the invention used to control and shape a field propagating in a zone;

FIG. 2 shows the path of the eddy currents and their associated induced flux developed by the apparatus of FIG. 1;

FIG. 3 shows the apparatus of FIG. 1 modified to control the paths of the eddy currents so as to provide a certain desired field effect;

FIG. 3A shows an enlarged view of the field lines between adjacent edges of the apparatus of FIG. 3;

FIG. 4 illustrates the modified apparatus of FIG. 3 further modified to prevent cancellation of the field effects of the eddy currents at adjacent edges of the apparatus;

FIG. 4A shows an enlarged view of the field lines between an adjacent pair of edges of the apparatus of FIG. 4;

FIG. 5A shows the apparatus of FIG. 1 modified in a further manner to prevent cancellation of the field effects of the eddy currents at adjacent edges of the apparatus;

FIG. 5B illustrates the eddy currents generated in apparatus of FIG. 5A as a result of the incident field;

FIG. 5C shows the induced fields resulting from the eddy currents in the apparatus of FIG. 5A;

FIG. 5D shows an enlargement of one of the field lines of the fields shown in FIG. 5C;

DETAILED DESCRIPTION

Figure 6:
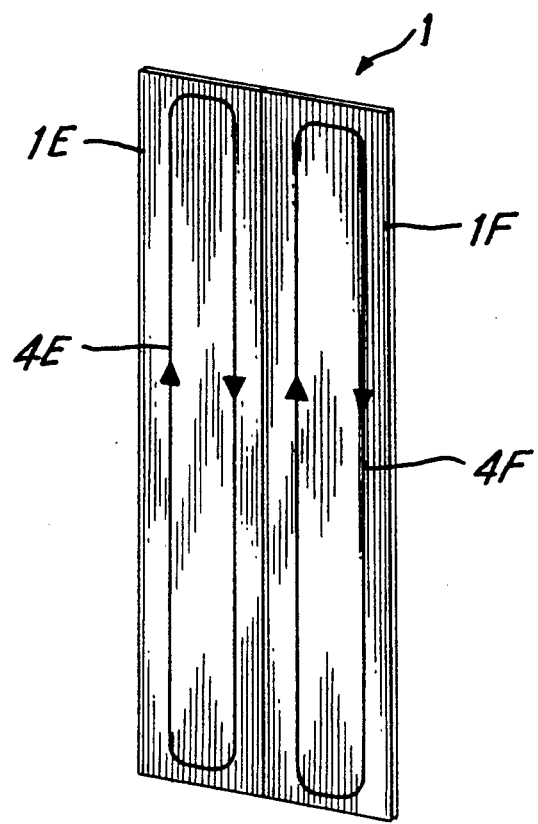
FIG. 6 shows a further modification of the apparatus of FIG. 1 to control the eddy currents so as to provide another desired field effect.

FIG. 1 shows an antenna 2 carrying an alternating current in the direction shown by the arrows 2A. The alternating current in the antenna 2 generates an alternating magnetic field 3, depicted by its flux lines, which extends forward of the antenna into a zone 10, i.e., the frontfield, and backward of the antenna, i.e., the backfield.

Situated adjacent to and in back of the antenna 2 is an apparatus 1, which, in accordance with the principles of the present invention, is designed to permit control and shaping of the magnetic field 3 and, in particular, its frontfield.

For illustrative purposes, the apparatus 1 is shown as a single sheet of material in FIG. 1, but its actual configuration and shape will be dictated by the particular field effects desired, as discussed in more detail hereinbelow. More particularly, in accordance with the invention, the sheet or apparatus 1 comprises a material whose characteristics, at the frequency $F_B$ of the magnetic field 3, are such that the magnetic field results in the generation of eddy currents in the apparatus 1. This is depicted in FIG. 2 by the representative eddy currents 4.

As is well known from Lenz's law, the eddy currents 4 induced in the apparatus 1 will be in a direction such that they themselves induce a magnetic field 5 which tends to oppose the incident field 3. The extent to which the induced magnetic field opposes the incident field 3 depends upon the phase of the induced field and the manner in which the induced field is oriented relative to the incident field.

The phase of the induced field 5 is dependent upon the conductivity of the apparatus 1, as well as on its other properties, including its permeability, at the frequency $F_B$ of the field 3. The orientation of the field, on the other hand, is modified by the geometry or configuration of the eddy currents which is determined by the geometry or configuration of the apparatus 1.

In accordance with the invention, some or all of these parameters of the apparatus 1 are controlled and selected so as to realize a preselected or predetermined effect on the field 3 in the zone 10 via the induced field 5. More particularly, this is accomplished by selecting the material of the apparatus 1 to have properties (i.e., conductivity, permeability, etc.) which provide a desired phase for the induced field 5, while the geometry of the apparatus is selected to provide a desired geometry for the eddy currents and, hence, a desired location and position of the induced field. These selections, in turn, control the induced field 5 so it combines with the incident field 3 in a way to provide the predetermined effect.

In selecting the parameters of the apparatus 1, it is important to note that if the conductivity of the apparatus is selected to be relatively high, the induced field 5 will be 180° out of phase with the incident field 3. On the other hand, if the conductivity of the apparatus is selected to be relatively low and the permeability relatively high, the induced field 5 will be closer to 90° out of phase with the incident field 3. By varying the conductivity of the apparatus 1, a phase difference between these two values is realized.

A variety of predetermined effects can also be achieved with the apparatus 1. One effect is to create field components in directions where the incident field 3 has no components or only weak components, so as to augment the incident field. A second effect is to reduce the stronger components of the field 3, while preserving the weaker field components. The latter effect can be used to make the field 3 more uniform.

FIG. 3 illustrates one way in which the configuration or geometry of the apparatus 1 can be adjusted in order to add vertical field components in the frontfield of the field 3. For purposes of explanation of FIG. 3 and the other figures, a common (x), (y), (z) reference coordinate system has been used in each figure. In the reference coordinate system, the vertical direction is indicated by the (z) coordinate direction, the horizontal direction by the (x) coordinate direction and the lateral direction by the (y) coordinate direction.

As shown in FIG. 3, the apparatus 1 has been split or cut horizontally into a plurality of spaced sections or members, shown as four members 1A to 1D. As a result of this splitting, the incident field 3 now induces eddy currents in each of these sections. The resultant eddy currents are shown as 4A to 4D and each induces a field along the horizontal edges of its corresponding member.

This can be seen more clearly in FIG. 3A which shows the fields at the adjacent edges of the members IA and IB. As a result of these fields, additional field content in the vertical or (z) direction is produced centrally of the apparatus 1. This additional field content thus supplements or augments the incident field 3 in this area, therefore, providing the desired effect.

To further enhance the added vertical field content produced by the modified apparatus 1 of FIG. 3, a low conductivity, high-permeability member can be situated between adjacent pairs of the members 1A to 1D. This tends to cause the fields produced at adjacent horizontal edges of the members to be attracted to the high-permeability member and, therefore, reduces the tendency of the induced fields at these edges from cancelling one another. Modification of the apparatus of FIG. 3 in this manner is illustrated in FIG. 4.

As shown, a low-conductivity, high-permeability member 11 is situated between the adjacent members (1A, 1B), (1B, 1C) and (1C, 1D). In the case shown, the members 11 are displaced from the plane of the members 1A–1D outward, as can be seen in the exploded view of the adjacent members 1A–1B in FIG. 4A. FIG. 4A also shows how the fields at the horizontal edges close to the members IA, IB are attracted to the member 11 so as to prevent cancellation of these fields close to the members. The material of the members 11 can be any type of material which exhibits the desired low-conductivity and high-permeability properties. A particular useful material might be the material used for the primary shields in the aforementioned '631 patent.

The non-cancellation effect provided by the members 11 of the apparatus of FIG. 4 can also be realized by tailoring or controlling the areas or portions of the members 1A–1D which receive the incident field. Thus, by ensuring that the exposed field portions or areas of adjacent members are of different size, the fields at adjacent horizontal edges of these portions will be of different strength and, hence, will tend not to cancel.

In the apparatus of FIG. 5A, this is accomplished by overlapping the members 1A–1D so that the outermost or end members 1A and 1D, which are not adjacent, have the same size areas exposed, while the member 1C has a smaller area exposed and the member 1D yet a smaller area. FIG. 5B shows the resultant eddy currents 4A to 4D in the members 1A–1D of the FIG. 5A apparatus and FIG. 5C shows the fields 5A to 5D induced by these currents. As can be appreciated from FIG. 5C, due to the different exposed areas of adjacent members, the fields from adjacent horizontal edges of the members are of different magnitudes and, hence, do not cancel one another. Furthermore, the blow-up of the field line 5D, shown in FIG. 5D, illustrates that the incident (y) direction field has resulted in an induced field in both the (y) and (z) directions. Thus, a desired vertical or (z) component field has been generated which augments the incident field 3 centrally, as above-described.

FIG. 6 shows the apparatus 1 with its geometry adjusted in order to provide another of the above-mentioned effects on the frontfield of the field 3. In this case, it is desired that the eddy currents be directed so that they are least detrimental to the field 3. This is accomplished by configuring the apparatus to provide eddy currents whose induced fields degrade primarily the stronger components of the field 3 (the (y) components), while minimizing any degradation in the weaker components, (the (z) components). This is realized in the FIG. 6 modification of the apparatus 1 by splitting or cutting the apparatus 1 in the vertical direction to result in sections or members 1E and 1F.

More particularly, as shown in FIG. 6, the members 1E and 1F result in eddy currents 4E and 4F which run along shortened horizontal edges of the members but also along additional central vertical edges. As a result of the former (shortened horizontal edges), the induced field from the members in the vertical or (z) direction will be weaker, and as a result of the latter (additional vertical edges), the induced field from the members in the horizontal or (x) and the lateral or (y) directions will be more evenly distributed across the horizontal width of the apparatus 1. The incident field 3 will thus be reduced more significantly where the field 3 has stronger field components and less significantly where the field 3 has weaker fields components, as was desired.

Figure 7:
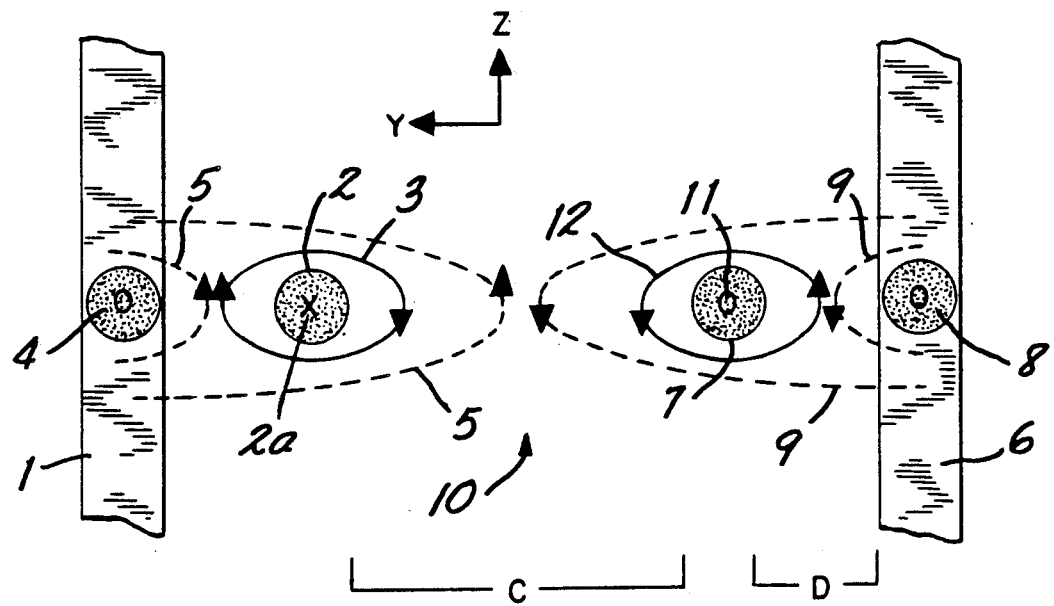
FIG. 7 shows the apparatus of the invention placed adjacent each of the transmit and receive antennas bordering a zone.

FIG. 7 shows the apparatus 1 and transmitting antenna 2 and, in particular, a vertical cross section through one horizontal leg of the antenna and through one eddy current path along the corresponding conductive surface of the apparatus. Also shown, in similar cross section, is a horizontal leg of a receiving antenna 7, in back of which is a further apparatus 6, likewise, in accordance with the invention, having characteristics which enable the apparatus 6 to give rise to eddy currents induced by magnetic fields in the zone 10. The eddy currents shown are those along the conductive surface of the apparatus 6 bordering the depicted horizontal leg of the apparatus. The combination of the apparatus 1 and antenna 2 border one end of the zone 10 and the combination of the apparatus 6 and antenna 7 border the opposite end of the zone.

In FIG. 7, the plane of the paper contains the vertical and lateral coordinate directions (z), (y), and the direction perpendicular to the paper contains the horizontal coordinate (x). As shown, the magnetic field lines 3 of the transmit antenna 2 are in dark line and are clockwise, with the antenna current 2A going into and perpendicular to the paper. The eddy currents 4 generated in the apparatus 1 are of opposite sense to the antenna current 2A, i.e., are directed out of the paper, and their induced field 5, depicted in broken line, is counterclockwise.

Assuming that the zone 10 is such that the field lines 3 of the transmitter antenna 2 reach the apparatus 6, it too generates an eddy current 8, also of opposite sense to the transmitter current 2A and, therefore, out of the paper. This eddy current causes a further counterclockwise field to be induced, indicated by field lines 9 shown in broken line.

The transmitter field 3 also causes the receiver antenna 7 to develop a current 11. This current is of opposite sense to the transmitter current (by Lenz's Law) and it causes the receiver antenna 7 to generate its own field 12. The receiver antenna 7 and the apparatus 6 are, however, spaced sufficiently far apart, i.e., the distance d is made sufficiently large, that the field 12 from the receiver 7 causes negligible eddy currents to be developed in the apparatus 6. The resultant field from these eddy currents can, therefore, be disregarded.

As can be appreciated from FIG. 7, the (z) and (y) components of the field 3 generated by the horizontal leg of the transmitter antenna 2 are altered or changed in various ways as a result of placement of the conductive surface of the apparatus 1 behind the transmitter antenna leg and the conductive surface of the apparatus 6 behind a horizontal leg of the receiver antenna 7. Thus, the eddy currents in the apparatus 1 tend to degrade both the (z) and (y) components of the flux 3. This is seen by the apparatus 1 flux 5 opposing the transmitter flux 3 in the (z) and (y) directions in the central region C of the zone 10. The eddy currents along the conductive surface of the apparatus 6, on the other hand, tend to enhance the (z) component and degrade the relatively stronger (y) component of the flux 3. This again can be seen by the direction of the flux 9 of the apparatus 6 in the central region C.

A similar analysis of the vertical legs of the antennas 2 and 7 and corresponding conductive surfaces of the apparatuses would show that the (x) and (y) components of the flux 3 are similarly degraded by the apparatus 1, but that the apparatus 6 tends to again enhance the (x) component and degrade the relatively stronger (y) component.

Accordingly, when using the apparatus 1 adjacent a transmitter antenna, as in FIG. 7, the conductivity of the apparatus 1 would necessarily have to be made low to reduce the overall amplitude of the fields generated by the resultant eddy currents. This would tend to minimize the degradation effect of the apparatus on the transmitter field. However, the conductivity would not be made so low as to make the apparatus 1 excessively lossy to the transmitter field. This permits a maximum extent to be realized for the zone 10. The conductivity of the apparatus 6 adjacent the receiver antenna, on the other hand, would be made relatively high to reinforce the desired effect of enhancement of the weaker field components of the field 3.

In the description of the FIG. 7, it was assumed that the apparatuses 1 and 6 were each highly conductive so that the induced eddy currents 4 and 8 were substantially 180° out of phase with the respective generating current 2. By varying the conductivity of the apparatus 1 and/or 6 and by utilizing a material which is also permeable at the frequency $F_B$ of the transmit field, the phasing of the induced currents and, therefore, the induced fields can be changed to alter or change the field effects produced by the apparatuses. Using these principles coupled with those previously discussed above, one can thus further tailor the field in the zone 10 to realize any further desired effects.

Figure 8:
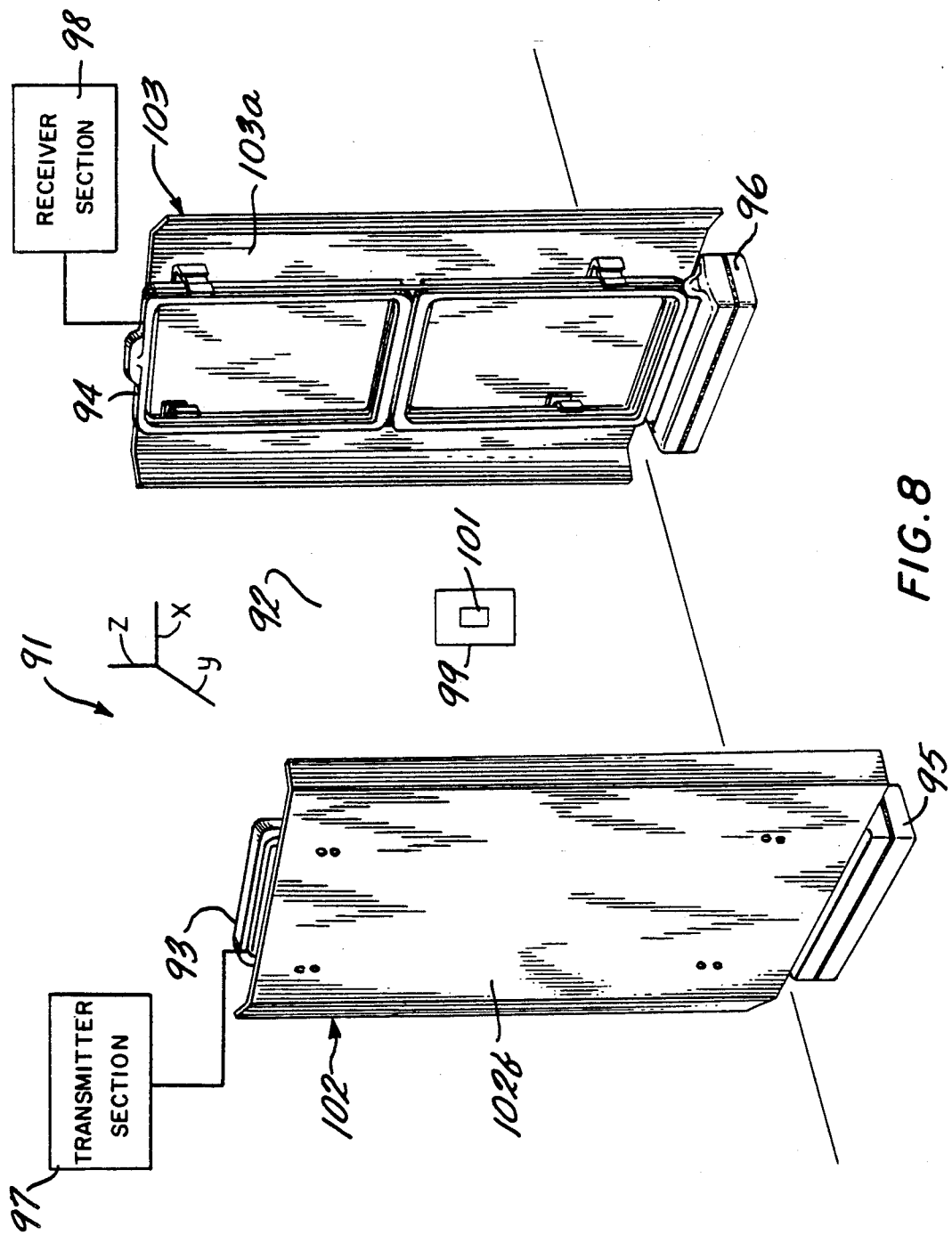
FIG. 8 illustrates an electronic article surveillance system utilizing apparatus of the present invention incorporated into shields placed adjacent the transmit and receive antennas of the system.

FIG. 8 shows a magnetic electronic article surveillance system 91 which includes apparatuses of the invention designed to control and shape the magnetic fields in the surveillance zone 92 of the system. As shown, the system comprises a transmitter antenna 93 and a receiver antenna 94 mounted to pedestals 95 and 96.

The transmitter antenna 93 is controlled by a transmitter section 97 which develops the necessary signals for driving the antenna. A receiver section 98, in turn, processes the signals received by the receiver antenna 94 to generate alarm signals. The sections 97 and 98 may communicate with each other for synchronization and other purposes and are conventional types of sections used in magnetic systems. Typical sections are described in the '631 patent.

The system 91 operates by transmitting a magnetic field into the surveillance zone 92 and detecting signals resulting from articles 99 passing through the zone. Each article 99 is provided with a magnetic tag 101 which results in such signals. These signals are then detected by the receiver antenna 94 and processed by the receiver section 98 to generate an alarm signal to indicate presence of the tag.

As discussed previously, in operation of the system 91, it is desirable to confine the transmitted field to the zone 92, i.e., the frontfield, and to avoid its passage into the backfield. Furthermore, it is desirable to have field components in the (x), (y) and (z) directions so as to accomodate various positions of the tags 99, as well as to otherwise promote the desired signal generation.

In an attempt to meet these requirements, the system 91 is provided with a transmitter shield 102 and a receiver shield 103, both of which include apparatus in accordance with invention for controlling and shaping the field. More particularly, FIGS. 9 and 10 show the transmitter shield 102 and receiver shield 103, respectively, in exploded view.

Figure 9:
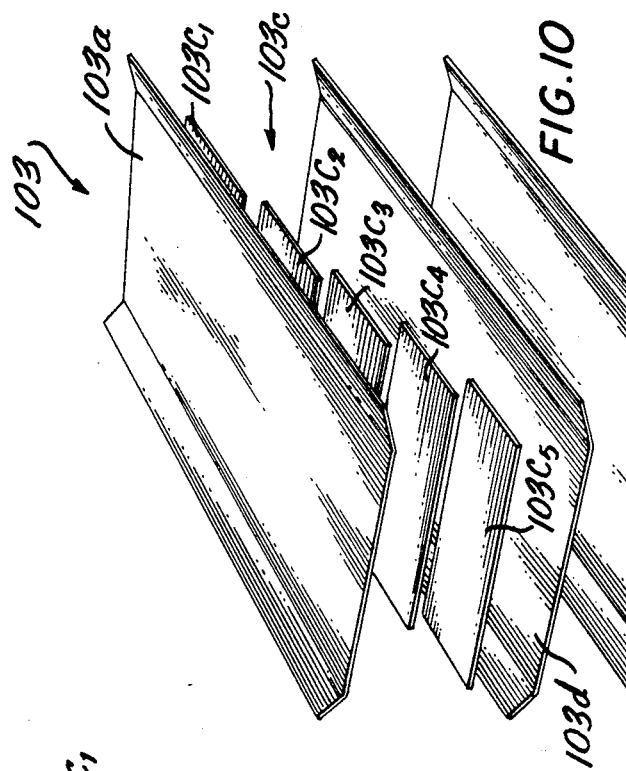
FIGS. 9 and 10 show exploded views, respectively, of the transmitter shield and the receiver shield of the system of FIG. 8.
Figure 10:
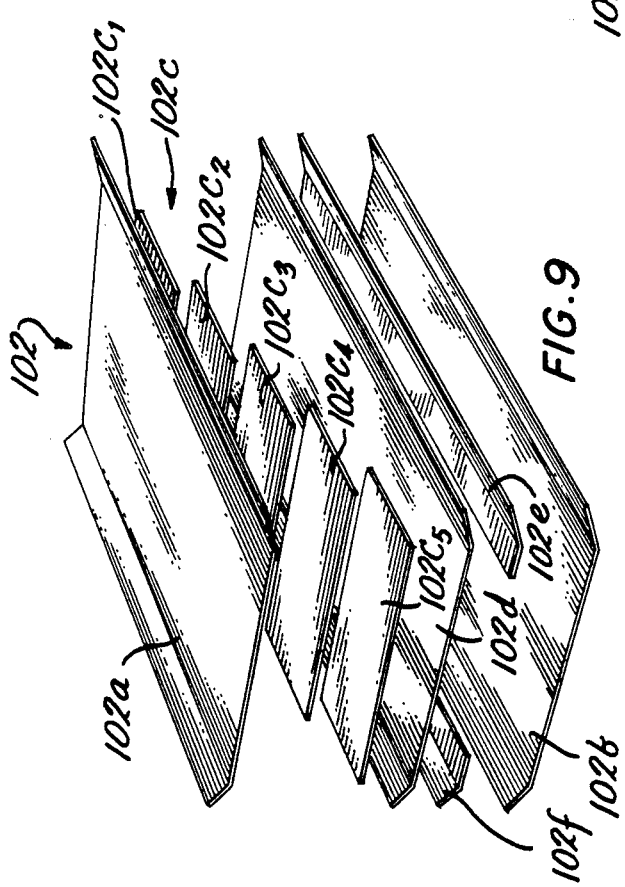

As shown in FIG. 9, the transmitter shield 102 comprises front and back support sections 102a and 102b which together form a housing for the shield. Following the front support 102a, the shield 102 includes an apparatus 102c which is designed, in accordance with the invention, to confine the transmitted field to the frontfield, while enhancing the uniformity of the field in the vertical or (z) direction. More particularly, the apparatus 102c comprises five spaced members $102C_1$, $102C_2$, $102C_3$, $102C_4$ and $102C_5$ each of which is made from a material which is conductive and also permeable at the frequency of the field of the transmitter antenna 93.

Due to the permeability of the members $102C_1$ to $102C_5$, the members provide a low reluctance path for the field of the antenna 93. As a result, the antenna field will substantially follow the members and be substantially prevented from entering the backfield. The conductivity of the members $102C_1$-$102C_5$, in turn, causes eddy currents to be established in the members and, as above-described, in connection with FIGS. 3-5, these currents, in passing along the centrally disposed horizontal edges of the members (i.e., those interior of the antenna horizontal arms), induce fields which add to the vertical field (z) of the antenna centrally. As a result, the vertical field along the length of the transmitter antenna becomes more uniform and the desired effect is achieved.

As above-discussed, the eddy currents of the members $102C_1$-$102C_5$ which run adjacent the arms of the antenna 93, tend to degrade the vertical, horizontal and lateral components (z), (x) and (y) of the antenna field in these areas. The conductivity of the members is thus made relatively low so as minimize these degradation effects. The permeability of the members, on the other hand, is made relatively high, since the antenna field is strongest at the antenna location and a high permeability is desirable in maximizing confinement of the field to the frontfield.

In order to further retain any field which might leak through the apparatus 102c from reaching the backfield, the shield 102 is further provided with a flat sheet 102d, also formed of a high permeability material, in back of the apparatus 102c. The sheet 102d may comprise the same material as that used for the members $102C_1$-$102C_5$.

The shield 102 is additionally provided with two conductive strips 102e and 102f in the area of the bends of the sheet 102d. These strips compensate for any leakage developed in the sheet 102d as result of bending the sheet at its edges.

Turning now to the shield 103 on the receiver antenna side, it is also of layered construction and includes front and back supports 103a and 103b which likewise house the remaining shield components. Following the support 103a is a further apparatus 103c also designed in accordance with the invention to shape and control the field in the zone 92, and, in particular, to enhance its weaker field components.

Figure 11:
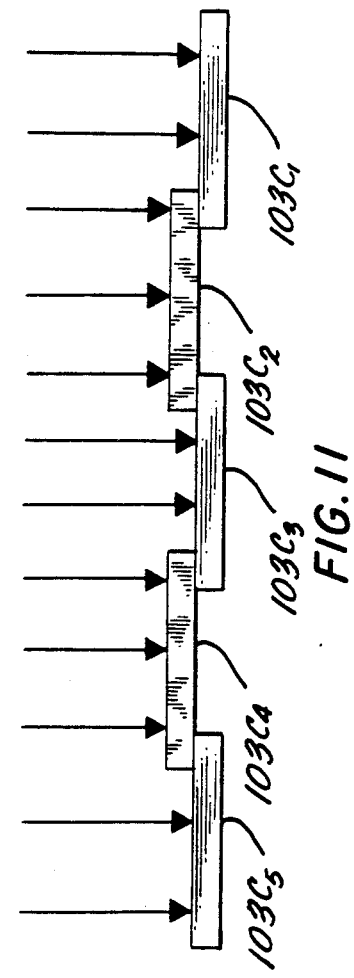
FIG. 11 shows a view of the overlapping elements of the apparatus of the invention used in the receiver shield of FIG. 10.

More particularly, the apparatus 103c includes five conductive members $103C_1$, $103C_2$, $103C_3$, $103C_4$ and $103C_5$. These members are arranged in overlapping relationship, as in the apparatus of FIG. 5A, so that adjacent members have different size areas exposed to the field in the zone 92. In the case shown, the members $103C_2$ and $103C_4$ are in front of and overlap the horizontal edges of their adjacent members on both sides, as shown in FIG. 11. This causes the development of eddy currents in the members which enhance the weaker vertical (z) and lateral (y) components of the field centrally, as previously discussed above.

In order to realize maximum enhancement, the members $103C_1$-$103C_5$ are formed from a highly conductive material. Morever, this material need not have high permeability or be permeable, as was required with the material of the members $102C_1$-$102C_5$, since the elements $103C_1$-$103C_5$ provide confinement of the field as well as enhancement.

The shield 103, however, is provided with a further sheet 103d following the apparatus 103c. This further sheet acts to prevent any field passing through the apparatus 103c from passing into the backfield. The sheet 103d can be made of a highly conductive material or can also be made from the same material as the sheet 102d.

Figure 12:
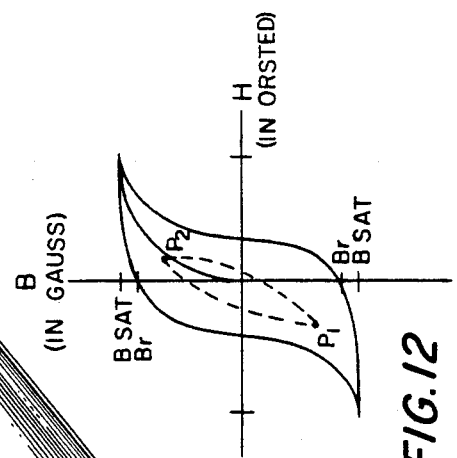
FIG. 12 shows a hysteresis loop for a magnetic material usable in the transmitter and receiver shields of FIGS. 9 and 10.

Shields embodying shields 102 and 103 have been designed for magnetic systems operating in the frequency range of 20 kHz to 100 kHz. In designing the transmitter shield, the following material properties and fabrication techniques were found to be desirable for the materials used to form the shield components 102c and 102d:

a. Relatively low conductivity (high resistivity) to maintain low induced eddy currents. Materials with relative conductivities of below approximately $0.29 \times 10^8$ (v/m) are preferable, as long as the conductivity is not so low as to cause excessive losses in the transmitter field.

b. Relatively high permeability to create a low reluctance path for the transmitter field. Ferromagnetic materials are preferable.

c. A dead soft temper, i.e., annealed material, since they have higher permeability, and less coercive field intensity (usually 50 A/m or less).

d. A grain oriented anneal. Grain orientation is achieved by rolling a material primarily along one direction during its fabrication. This process is especially effective if the material is hot rolled. Annealing is the process of relieving stresses in the material by either heating the material, (a preferred method for common magnetic materials such as iron and steel) or exposing the material to a field whose direction is parallel to the grain of the material (a preferred method for exotic materials such as Mumetal or Molypermalloy). In the case of exotic materials, sometimes both methods are used. This property is particularly desirable, if the orientation of the transmit field is in a few specified directions, with the variance in incident field angle being small, because orienting the grain of the material parallel to the field direction improves permeability.

e. Skin depth and thickness sufficient for a given field intensity to avoid saturation of the material. This may be achieved through the use of laminations (several thin layers of material). When laminations are used, attenuation of the composite layers of material is greater than the sum of the attenuations of each layer. This is true because the first layer of material reduces the field acting on the second layer and subsequent layers. As an example, if two layers were used and in the first layer the field is reduced by a factor of 20, then the total shielding is 20 times the reduction for the inner layer at the field strength acting on the inner layer. The net attenuation is close to the multiplication of the individual attenuations. To avoid saturation of the material, the field induced within the shield (H, the flux density) must not exceed the saturation flux density where H is defined by $$H = B/\mu \text{ } eff$$

where B is the field intensity in Gauss, H is the flux density in Oersted, and $\mu_{eff}$ is the effective mu of the material. FIG. 12 shows the hysteresis loop of a typical magnetic material. Ideal operation would be along the contour connecting P1 and P2.

f. The aforementioned properties are frequency and field strength dependent, and must hold true for the shielding material at the field strength and frequency of the field to be tailored.

Likewise, in designing the component 103c of the receiver of shield 103, the following material properties were considered desirable:

a. High conductivity (low resistivity) to induce the flow of eddy currents. Conductivities of $0.29 \times 10^8$ v/m or greater are preferable.

b. Thickness sufficient to sustain eddy currents. A thickness of one skin depth or greater at the frequency of the field to be tailored is desirable, where the formula for the skin depth is as follows:

$$S = 2.6/\sqrt{f\mu_r\delta_r} \text{ in.}$$

The skin depth by this formula is in inches with f being the frequency of the incident waveform, and $\mu_4$ and $\delta_r$ being the permeability and conductivity of the material respectively.

In the design of actual shields 102 and 103 to operate in the containment of a transmit signal with an H field amplitude of 20 Oersted and a frequency of 58 kHZ to 60 kHZ, the following materials were used

| Components | Material |
| --- | --- |
| 102a, 102b, 103a, 103b | ABS Plastic |
| 102c, 103d, 102d | Low carbon steel (6 mils), 8-13% carbon content or 2-6% carbon content (Vitrenamel), fully annealed, magnetic material |
| 102f, 102e, 103c | copper foil (1 mil) |

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention. Thus, for example, while the apparatus 1 is shown in FIG. 2 as comprising multiple sections, only one of the sections might need to be used depending upon the effect to be achieved. Also, the sections of the apparatus 102 of FIG. 9 can be arranged to provide exposed areas of different sizes for adjacent sections. This can be accomplished by overlapping the sections as was done for the apparatus 103 of FIG. 10. Additionally, in the apparatus 1 configuration of FIG. 3, instead of using spaced members 1A-1D and the members 11, the apparatus 1 can be a continuous sheet with the members 11 placed in front of the sheet to define and isolate sheet sections from the incident field.

What is claimed is:

1. Apparatus for use in shaping a magnetic field in a zone, said apparatus comprising:
   means for generating eddy currents;
   means for causing said eddy currents to be of a character to have at least a preselected effect on said field when said apparatus is situated bordering said zone, said preselected effect including reinforcing components and/or weakening selected components of said field, said means for causing including selecting the configuration of said generating means such that eddy currents of said character are generated by said generating means.

2. Apparatus in accordance with claim 1 wherein:
   said generating means includes a plurality of members and said configuration of said generating means includes the shape of said members and the relationship of said members one to the other.

3. Apparatus in accordance with claim 2 wherein:
   said members are conductive.

4. Apparatus in accordance with claim 3 further comprising:
   magnetic means situated adjacent said generating means such that when said apparatus is situated bordering said zone said magnetic means is further outward of said zone than said generating means and acts to prevent said field from extending outward of said zone.

5. Apparatus in accordance with claim 4 wherein:
   said members comprise one of aluminum, copper, a superconductive material and a material whose conductivity is equal to or greater than about $0.29 \times 10^8$ v/m.

6. Apparatus in accordance with claim 5 wherein:
   said magnetic means comprises low carbon steel.

7. Apparatus in accordance with claim 6 further comprising:
   front and back members which form a housing in which said generating means and magnetic means are disposed.

8. Apparatus in accordance with claim 7 wherein:
   said apparatus is for further use with an antenna which receives said field and which borders said zone adjacent said apparatus when said apparatus is situated bordering said zone.

9. Apparatus in accordance with claim 3 wherein:
   said members are further magnetic such that said members, in addition to generating said eddy currents, also provide a low reluctance path which acts to prevent said field from extending outward of said zone when said apparatus is situated bordering said zone.

10. Apparatus in accordance with claim 9, further comprising:
    magnetic means situated adjacent said generating means such that when said apparatus is situated bordering said zone said magnetic means is further outward of said zone than said generating means and acts to further prevent said field from extending outward of said zone.

11. Apparatus in accordance with claim 10 wherein:
    the conductivity of said members is less than about $0.29 \times 10^8$ v/m.

12. Apparatus in accordance with claim 11 wherein:

said members comprise low carbon steel.

13. Apparatus in accordance with claim 12 wherein:
the carbon content of said steel is between about 8 to 10 percent.

14. Apparatus in accordance with claim 12 wherein:
the carbon content of said steel is between about 2 to 6 percent.

15. Apparatus in accordance with claim 14 wherein:
said steel is Vitrenamel.

16. Apparatus in accordance with claim 12 further comprising:
front and back members which form a housing in which said generating means and magnetic means are disposed.

17. Apparatus in accordance with claim 16 wherein:
the apparatus is for further use with an antenna which transmits said field and which borders said zone adjacent said apparatus when said apparatus is situated bordering said zone.

18. Apparatus in accordance with claim 2 wherein:
said members are one of: conductive; and conductive and magnetic.

19. Apparatus in accordance with claim 18 wherein:
said members are arranged and configured and/or said apparatus includes further means such that when said apparatus in situated adjacent said zone, the eddy current effects on said field from adjacent members do not entirely cancel.

20. Apparatus in accordance with claim 19 wherein:
the areas of adjacent members exposed to said field are of different size to realize said non-cancellation.

21. Apparatus in accordance with claim 20 wherein:
said members are arranged in overlapping relationship to realize such different size exposed areas.

22. Apparatus in accordance with claim 19 wherein:
said further means includes a low conductivity, high permeability material disposed between adjacent edges of said adjacent members to realize said non-cancellation.

23. Apparatus in accordance with claim 19 wherein:
said members are arranged such that edges of said members extend in a given direction, whereby the effect of the eddy currents of said members at said edges on said field includes reinforcement of at least parts of said field in a direction transverse to said given direction.

24. Apparatus in accordance with claim 23 wherein:
said members are arranged such that edges of said members extend horizontally, whereby the effect of the eddy currents of said members at said edges on said field includes reinforcement of at least parts of said field in the vertical direction.

25. Apparatus in accordance with claim 23 wherein:
said members are arranged such that edges of said members extend vertically, whereby the effect of the eddy currents of said members at said edges of said members on said field includes reinforcement of at least parts of said field in at least one of the horizontal and lateral directions.

26. Apparatus in accordance with claim 1 wherein:
said generating means is conductive.

27. Apparatus in accordance with claim 26 wherein:
said apparatus is to be used with an antenna which borders said zone and is adjacent said apparatus when said apparatus is situated bordering said zone;
and said antenna is one of: an antenna transmitting said field in response to an electrical signal; an antenna subject to said field which field is generated by another antenna bordering said zone or by a magnetic material in said zone; and an antenna transmitting said field in response to a field generated by another antenna bordering said zone;
and said effect includes reinforcement of at least portions of said field.

28. Apparatus in accordance with claim 27 wherein:
said generating means comprises one of copper, aluminum, a superconductive material and a material whose conductivity is equal to or greater than $0.29 \times 10^8$ $v/m$.

29. Apparatus in accordance with claim 27 wherein:
said generating means includes a plurality of members and said configuration of said generating means includes the shape of said members and the relationship of said members one to the other.

30. Apparatus in accordance with claim 29 wherein:
said members are arranged and configured and/or said apparatus includes further means such that when said apparatus is situated adjacent said zone, the eddy current effects on said field from adjacent members do not entirely cancel.

31. Apparatus in accordance with claim 30 wherein:
said members are arranged such that edges of said members extend in a given direction, whereby the effect of the eddy currents of said members at said edges on said field includes reinforcement of at least parts of said field in a direction transverse to said given direction.

32. Apparatus in accordance with claim 31 wherein:
said generating means comprises one of copper, aluminum, a superconductive material and a material whose conductivity is equal to or greater than $0.29 \times 10^8$ $v/m$.

33. Apparatus in accordance with claim 32 further comprising:
magnetic means situated adjacent said generating means such that when said apparatus is situated bordering said zone said magnetic means is further outward of said zone than said generating means and acts to prevent said field from extending outward of said zone.

34. Apparatus in accordance with claim 27 wherein:
said antenna is an antenna transmitting said field;
said effect includes subtracting from strongest portions of said field while tending to preserve the weakest portions of said field;
and said generating means is further magnetic such that, in addition to generating said eddy currents, said generating means provides a low reluctance path which acts to prevent said field from extending outward of said zone when said apparatus is situated adjacent said zone.

35. Apparatus in accordance with claim 34 wherein:
said generating means includes a plurality of members and said configuration of said generating means includes the shape of said members and the relationship of said members one to the other.

36. Apparatus in accordance with claim 35 wherein:
said members are arranged and configured and/or said apparatus includes further means such that when said apparatus in situated adjacent said zone, the eddy current effects on said field from adjacent members do not entirely cancel.

37. Apparatus in accordance with claim 36 wherein:
said members are arranged such that edges of said members extend in a given direction, whereby the effect of the eddy currents of said members at said edges on said field includes reinforcement of at least parts of said field in a direction transverse to said given direction.

38. Apparatus in accordance with claim 37 wherein: the conductivity of said generating means is less than about $0.29 \times 10^8$ v/m.

39. Apparatus i accordance with claim 38 wherein: said generating means comprises low carbon steel.

40. Apparatus i accordance with claim 39 wherein: the carbon content of said steel is between about 8 to 10 percent.

41. Apparatus in accordance with claim 39 wherein: the carbon content of said steel is between about 2 to 6 percent.

42. Apparatus in accordance with claim 41 wherein: said steel is Vitrenamel.

43. Apparatus in accordance with claim 26 wherein: said generating means is further magnetic such that, in addition to generating said eddy currents, said generating means also provides a low reluctance path which acts to prevent said field from extending outward of said zone when said apparatus is situated adjacent said zone.

44. Apparatus in accordance with claim 43 wherein: said generating means includes a plurality of members and said configuration of said generating means includes the shape of said members and the relationship of said members one to the other, said members being arranged and configured and/or said apparatus further including further means such that when said apparatus is situated adjacent said zone, the eddy current effects on said field from adjacent members do not entirely cancel.

45. Apparatus in accordance with claim 44 wherein: said members are arranged such that edges of said members extend in a given direction, whereby the effect of the eddy currents of said members at said edges on said field includes reinforcement of at least parts of said field in a direction transverse to said given direction.

46. Apparatus in accordance with claim 45 wherein: the conductivity of said generating means is less than about $0.29 \times 10^8$ v/m.

47. Apparatus in accordance with claim 46 wherein: said generating means comprises low carbon steel.

48. A method for use in shaping a magnetic field in a zone, said method comprising:
generating eddy currents with a generating means;
causing said eddy currents to be of a character to have at least a preselected effect on said field when said generating means is situated bordering said zone, said preselected effect including reinforcing components and/or weakening selected components of said field, said step of causing including selecting the configuration of the generating means generating the eddy currents such that eddy currents of said character are generated by said generating means.

49. A method in accordance with claim 48 wherein: said step of selecting includes forming said generating means from a plurality of members and further selecting the shape of said members and the relationship of said members one to the other.

50. A method in accordance with claim 49 wherein: said members are conductive.

51. A method in accordance with claim 49 wherein: said members are one of: conductive; and conductive and magnetic.

52. A method in accordance with claim 51 wherein: said step of further selecting includes arranging and shaping said members and/or incorporating a further means with said members in forming said generating means such that when said generating means is situated adjacent said zone, the eddy current effects on said field from adjacent members do not entirely cancel.

53. A method in accordance with claim 52 wherein: the areas of adjacent members exposed to said field are selected to be of different size to realize said non-cancellation.

54. A method in accordance with claim 53 wherein: said members are arranged in overlapping relationship to realize said non-cancellation.

55. A method in accordance with claim 52 wherein: low-conductivity, high-permeability material is disposed between adjacent edges of said adjacent members to realize said non-cancellation.

56. A method in accordance with claim 52 wherein: said members are arranged such that edges of said members extend in a given direction, whereby the effect of the eddy currents of said members at said edges on said field includes reinforcement of at least parts of said field in a direction transverse to said given direction.

57. A method in accordance with claim 56 wherein: said members are arranged such that edges of said members extend horizontally, whereby the effect of the eddy currents of said members at said edges on said field includes reinforcement of at least parts of said field in the vertical direction.

58. A method in accordance with claim 56 wherein: said members are arranged such that edges of said members extend vertically, whereby the effect of the eddy currents of said members at said edges on said field includes reinforcement of at least parts of said field in at least one of the horizontal and lateral directions.

59. A method in accordance with claim 48 wherein: said generating means is conductive.

60. A method in accordance with claim 59 wherein: said eddy currents are to be used with an antenna which borders said zone and is adjacent said eddy currents when said generating means generating said eddy currents is situated bordering said zone;
and said antenna is one of: an antenna transmitting said field in response to an electrical signal; an antenna subject to said field which is generated by another antenna bordering said zone or by a magnetic material in said zone; and an antenna transmitting said field in response to a field generated by another antenna bordering said zone;
and said effect includes reinforcement of at least portions of said field.

61. A method in accordance with claim 60 wherein: said antenna is an antenna transmitting said field;
said effect includes subtracting from the strongest portions of said field while tending to preserve the weakest portions of said field;
and said generating means is further magnetic such that, in addition to generating said eddy currents, said generating provides a low reluctance path means which acts to inhibit said field from extending outward of said zone when said generating means is situated adjacent said zone.

62. A method in accordance with claim 61 wherein: said step of selecting includes forming said generating means from a plurality of members and further selecting the shape of said members and the relationship of said members one to the other.

63. A method in accordance with claim 62 wherein: said step of further selecting includes arranging and shaping said members and/or incorporating a further means with said members in forming said generating means such that when said generating means is situated adjacent said zone, the eddy current effects on said field from adjacent members do not entirely cancel.

64. A method in accordance with claim 63 wherein: said members are arranged such that edges of said members extend in a given direction, whereby the effect of the eddy currents of said members at said edges on said field includes reinforcement of at least parts of said field in a direction transverse to said given direction.

65. A method in accordance with claim 64 wherein: the conductivity of said generating means is less than about $0.29 \times 10^8$ $v/m$.

66. A method in accordance with claim 65 wherein: said generating means comprises low carbon steel.

67. A method in accordance with claim 66 wherein: the carbon content of said steel is between about 8 to 10 percent.

68. A method in accordance with claim 66 wherein: the carbon content of said steel is between about 2 to 6 percent.

69. A method in accordance with claim 68 wherein: said steel is Vitrenamel.

70. A method in accordance with claim 60 wherein: said generating means comprises one of copper, aluminum, a superconductive material and a material whose conductivity is equal to or greater than $0.29 \times 10^8$ $v/m$.

71. A method in accordance with claim 70 further comprising:
situating magnetic means adjacent said generating means such that said magnetic means is further outward of said zone than said generating means and acts to prevent said field from extending outward of said zone.

72. A method in accordance with claim 60 wherein: said step of selecting includes forming said generating means from a plurality of members and further selecting the shape of said members and the relationship of said members one to the other.

73. A method in accordance with claim 72 wherein: said step of further selecting includes arranging and shaping said members and/or incorporating a further means with said members in forming said generating means such that when said generating means is situated adjacent said zone, the eddy current effects on said field from adjacent members do not entirely cancel.

74. A method in accordance with claim 73 wherein: said members are arranged such that edges of said members extend in a given direction, whereby the effect of the eddy currents of said members at said edges on said field includes reinforcement of at least parts of said field in a direction transverse to said given direction.

75. A method in accordance with claim 74 wherein: said generating means comprises one of copper, aluminum, a superconductive material and a material whose conductivity is equal to or greater than $0.29 \times 10^8$ $v/m$.

76. A method in accordance with claim 59 wherein: said generating means is further magnetic such that, in addition to generating said eddy currents, said generating means provides a low reluctance path which acts to prevent said field from extending outward of said zone when said apparatus is situated adjacent said zone.

77. A method in accordance with claim 76 wherein: the conductivity of said generating means is less than about $0.29 \times 10^8$ $v/m$.

78. A method in accordance with claim 77 wherein: said generating means comprises low carbon steel.

79. An article surveillance system in which articles containing magnetic markers are to be detected passing through a surveillance zone, comprising:
means for transmitting a magnetic field into said zone, said transmitting means including a transmitter antenna;
receiving means responsive to the magnetic field in said zone, said receiving means including a receiver antenna;
and apparatus for controlling and shaping the magnetic field in said zone comprising: means for generating eddy currents; and means for causing said eddy currents to be of a character to have at least a preselected effect on the field in said zone, said preselected effect including reinforcing components and/or weakening selected components of said field, said means for causing including selecting the configuration of said generating means such that eddy currents of said character are generated by said generating means.

80. A system in accordance with claim 79 wherein: said apparatus is adjacent one of said transmitter and receiver antennas.

81. A system in accordance with claim 79 wherein: said generating means includes a plurality of members and said configuration of said generating means includes the shape of said members and the relationship of said members one to the other.

82. A system in accordance with claim 81 wherein: said members are one of: conductive; and conductive and magnetic.

83. A system in accordance with claim 82 wherein: said apparatus further comprises: magnetic means situated adjacent said generating means such that when said apparatus is situated bordering said zone said magnetic means is further outward of said zone than said generating means and acts to prevent said field from extending outward of said zone.

84. A method of detecting articles containing magnetic markers passing through a surveillance zone, comprising:
transmitting with a transmitter antenna a magnetic field into said zone;
receiving with a receiving antenna the magnetic field in said zone;
and controlling and shaping the magnetic field in said zone comprising: generating eddy currents with a generating means, and causing said eddy currents to be of a character to have at least a preselected effect on the field in said zone, said preselected effect including reinforcing components and/or weakening selected components of said field, said step of causing including selecting the configuration of the generating means generating the eddy currents such that eddy currents of said character are generated by said generating means.

85. A method in accordance with claim 84 wherein: said shaping and controlling of said field is carried out with said generating means adjacent one of said transmitter and receiver antennas.

86. A method in accordance with claim 85 wherein: said generating means includes a plurality of members and said selecting the configuration of said apparatus includes further selecting the shape of said members and the relationship of said members one to the other.

87. A method in accordance with claim 86 wherein; said members are one of: conductive; and conductive and magnetic.

88. A method in accordance with claim 87 further comprising:
situating magnetic means adjacent said generating means such that said magnetic means is further outward of said zone than said generating means and acts to prevent said field from extending outward of said zone.

* * * * *